US012036800B2

(12) United States Patent
Murate

(10) Patent No.: US 12,036,800 B2
(45) Date of Patent: Jul. 16, 2024

(54) INKJET PRINTER, PRINTING SYSTEM, AND METHOD FOR PRODUCING PRINTED MATTER

(71) Applicant: Hirohito Murate, Kanagawa (JP)

(72) Inventor: Hirohito Murate, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 18/049,349

(22) Filed: Oct. 25, 2022

(65) Prior Publication Data

US 2023/0137201 A1 May 4, 2023

(30) Foreign Application Priority Data

Oct. 29, 2021 (JP) ................................ 2021-177881

(51) Int. Cl.
*B41J 2/21* (2006.01)

(52) U.S. Cl.
CPC ...................................... *B41J 2/21* (2013.01)

(58) Field of Classification Search
CPC .. B41J 2/21; B41J 3/546; B41J 2/2114; B41F 16/0006; B41F 19/007; B41M 7/0027
See application file for complete search history.

(56) References Cited

U.S. PATENT DOCUMENTS

| | | | | |
|---|---|---|---|---|
| 7,585,813 | B2 * | 9/2009 | Shimbo | B41M 5/305 503/201 |
| 2015/0367633 | A1 | 12/2015 | Murate | |
| 2016/0375684 | A1 | 12/2016 | Murate | |
| 2017/0165962 | A1 | 6/2017 | Mizutani et al. | |
| 2020/0298556 | A1 | 9/2020 | Murate | |

FOREIGN PATENT DOCUMENTS

| | | |
|---|---|---|
| JP | 2011-230501 | 11/2011 |
| JP | 2014-124941 | 7/2014 |
| JP | 2018-176581 | 11/2018 |

* cited by examiner

*Primary Examiner* — Justin Seo
(74) *Attorney, Agent, or Firm* — IPUSA, PLLC

(57) ABSTRACT

An inkjet printer for forming, on a base, an image layer and an adhesive layer on which foil is to be formed includes a first head, a second head, and processing circuitry. The first head discharges an ink for the image layer. The second head discharges inks for the adhesive layer including a first ink and a second ink. The second ink has a lower wet spreadability than a wet spreadability of the first ink. The processing circuitry controls the second head to form an image area included in the adhesive layer with the second ink in a case where a width of the image area is less than a threshold, and form the image area with the first ink in a case where the width of the image area is not less than the threshold.

7 Claims, 8 Drawing Sheets

INKJET PRINTER, PRINTING SYSTEM, AND METHOD FOR PRODUCING PRINTED MATTER

CROSS-REFERENCE TO RELATED APPLICATION

This patent application is based on and claims priority pursuant to 35 U.S.C. § 119(a) to Japanese Patent Application No. 2021-177881, filed on Oct. 29, 2021, in the Japan Patent Office, the entire disclosure of which is hereby incorporated by reference herein.

BACKGROUND

Technical Field

The present disclosure relates to an inkjet printer, a printing system, and a method for producing a printed matter.

Related Art

A technique has been known in which ink applied onto a recording medium using an inkjet printer is used as an adhesive member to adhere foil to the recording medium to thus transfer the foil.

Furthermore, a configuration including: a color ink layer including an image portion; an adhesive layer provided on the image portion in a stacked manner; and a foil body provided on the adhesive layer and stuck to the adhesive layer in a stacked manner has been disclosed.

SUMMARY

In an embodiment of the present disclosure, there is provided an inkjet printer for forming, on a base, an image layer and an adhesive layer on which foil is to be formed. The inkjet printer includes a first head, a second head, and processing circuitry. The first head discharges an ink for the image layer. The second head discharges inks for the adhesive layer including a first ink and a second ink. The second ink has a lower wet spreadability than a wet spreadability of the first ink. The processing circuitry controls the second head to form an image area included in the adhesive layer with the second ink in a case where a width of the image area is less than a threshold, and form the image area with the first ink in a case where the width of the image area is not less than the threshold.

In another embodiment of the present disclosure, there is provided a method for producing a printed matter with an inkjet printer to form, on a base, an image layer and an adhesive layer on which foil is to be formed. The method includes: discharging an ink for the image layer from a first head of the inkjet printer; discharging, from a second head, inks for the adhesive layer including a first ink and a second ink having a wet spreadability lower than a wet spreadability of the first ink; and controlling the second head to form an image area included in the adhesive layer with the second ink in a case where a width of the image area is less than a threshold, and form the image area with the first ink in a case where the width of the image area is not less than the threshold.

DETAILED DESCRIPTION OF EMBODIMENTS

Figure 1:
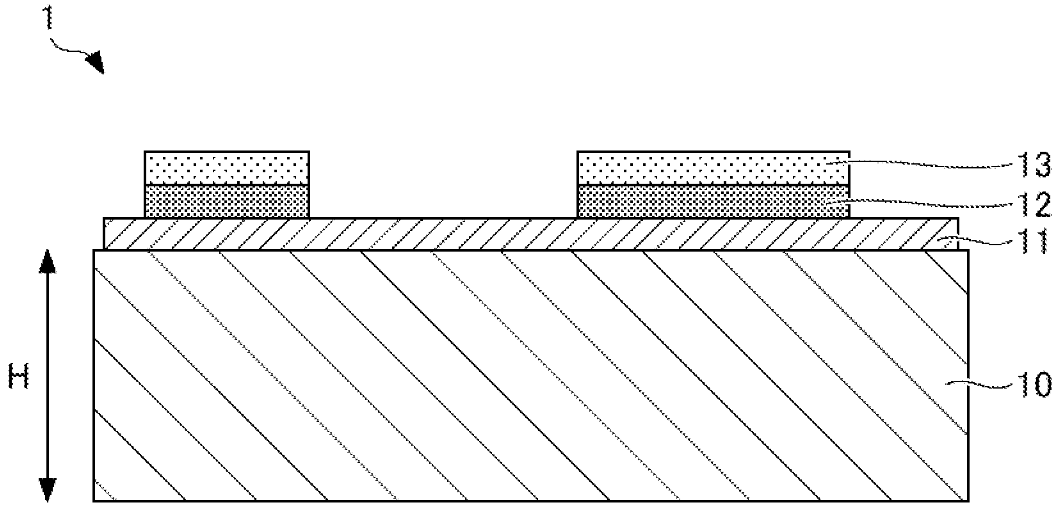
FIG. 1 is a cross-sectional view of a first configuration example of a printed matter according to an embodiment.

Hereinafter, embodiments of the present disclosure are described in detail with reference to the accompanying drawings. In the drawings, like reference signs denote like elements, and redundant description may be omitted where appropriate.

Further, the embodiments described below exemplify an inkjet printer, a printing system, and a method for producing a printed matter for embodying the technical idea of the present disclosure, and the present disclosure is not limited to the embodiments described below. For example, the dimensions, materials, and shapes of components and the relative positions of the arranged components are given by way of example in the following description, and the scope of the present disclosure is not limited thereto unless particularly specified. The sizes, positional relations, and the like of components illustrated in the drawings may be exaggerated for clarity of description.

It is assumed that printing, image formation, word printing, and recording in the terms of the embodiments are synonyms.

Hereinafter, a description is given of an embodiment of the present disclosure.

Configuration Example of Printed Matter

Figure 2:
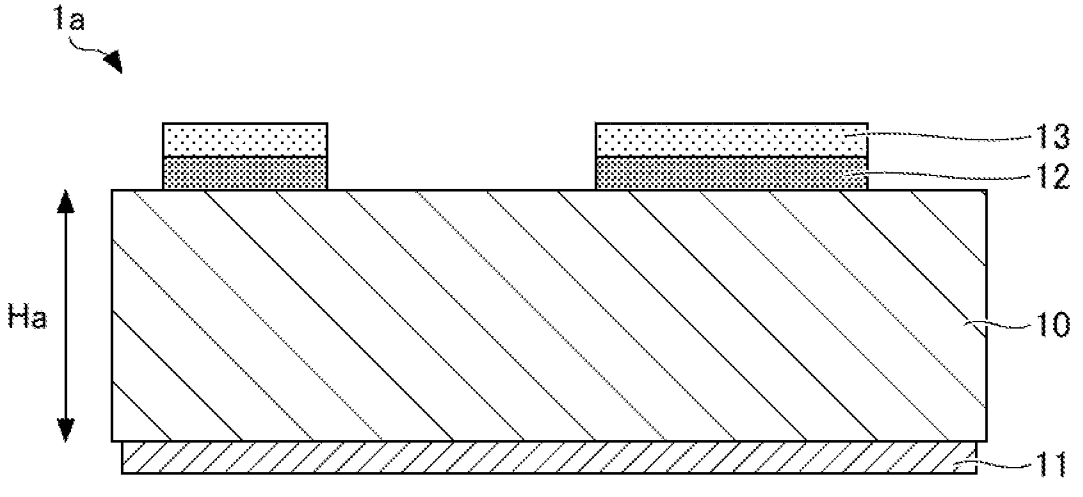
FIG. 2 is a cross-sectional view illustrating a second configuration example of a printed matter according to an embodiment.
Figure 3:
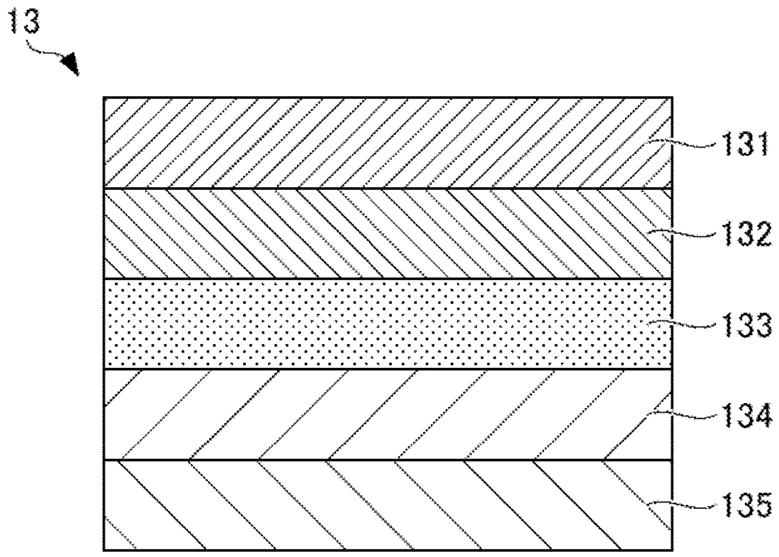
FIG. 3 is a cross-sectional view of a configuration example of foil on a printed matter according to an embodiment.

A configuration of a printed matter 1 according to an embodiment will be described with reference to FIGS. 1 to 3. FIGS. 1 and 2 are cross-sectional views illustrating configurations of printed matters. FIG. 1 illustrates a printed matter 1 according to a first example. FIG. 2 illustrates a printed matter 1*a* according to a second example. FIG. 3 is a cross-sectional view illustrating a configuration of foil 13 on the printed matter 1 or 1*a*.

As illustrated in FIG. 1, the printed matter 1 includes a base 10, an image layer 11, and an adhesive layer 12. The printed matter 1 also includes the foil 13 on the adhesive layer 12.

The base 10 is a plate-like or sheet-like member that has transmittance with respect to visible light, and includes a resin material, such as acrylic, polyvinyl chloride, or polycarbonate, glass, or the like. The visible light is, for example, light having a wavelength of about 380 nm to about 780 nm.

The image included in the image layer 11 is any image including an image of a character, a landscape, an animal, or the like. The image layer 11 is formed by printing on one of surfaces of the base 10. In the present embodiment, the image layer 11 is formed with ink discharged from an inkjet printer. The inkjet printer will be separately described in detail with reference to FIG. 5.

The adhesive layer 12 is a layer that serves as an adhesive member for transferring the foil 13. Foil can be transferred onto the adhesive layer 12. In the printed matter 1, the adhesive layer 12 is formed on the same surface of the base 10 as the surface on which the image layer 11 is formed. In the present embodiment, the adhesive layer 12 is formed with ultraviolet curable ink discharged from the inkjet printer.

The foil 13 is formed on the adhesive layer 12 by a foil transfer apparatus to enhance the glossy impression of the printed matter 1. The foil transfer apparatus will be separately described in detail with reference to FIG. 8.

The distance H illustrated in FIG. 1 represents a distance corresponding to the thickness of the base 10. The non-glossy base 10 is used to increase the contrast with the glossy impression of the foil 13 to emphasize the gloss of the foil 13.

On the other hand, as illustrated in FIG. 2, in the printed matter 1*a*, the adhesive layer 12 is formed on a surface of the base 10 opposite to the surface on which the image layer 11 is formed. The distance Ha illustrated in FIG. 2 represents the distance between the image layer 11 and the foil 13 on the adhesive layer 12. In the printed matter 1*a*, a three-dimensional effect can be obtained by appropriately selecting the distance Ha.

The configuration of the printed matter 1*a* is similar to the configuration of the printed matter 1 except for the surface of the base 10 on which the adhesive layer 12 is formed, and thus redundant description will be omitted. Hereinafter, the printed matter 1 will be described as a representative printed matter, but the printed matter 1*a* is similar.

As illustrated in FIG. 3, the foil 13 mainly includes three layers of a coloring layer 133, a deposited layer 134, and a foil adhesive layer 135. Before being transferred to the base 10, the foil 13 is laminated and held on a base film 131 with a release layer 132 between the foil 13 and the base film 131.

The base film 131 functions as a base for holding the release layer 132, the coloring layer 133, the deposited layer 134, and the foil adhesive layer 135.

The release layer 132 is a layer for making it easy to peel the coloring layer 133, the deposited layer 134, and the foil adhesive layer 135 off the base film 131 at a time of the transfer to the printed matter 1.

The coloring layer 133 is a layer that colors the foil 13. For example, the coloring layer 133 is a yellow layer for the foil 13 that is golden.

The deposited layer 134 is a metal layer for expressing glossy impression.

The foil adhesive layer 135 is a layer for the transfer to the printed matter 1 as a transfer target object.

In the present embodiment, the configuration of the foil 13 before transfer to the base 10 is a roll-like configuration in which the base film 131 holding the foil 13 is wound around a paper tube. However, this configuration is not limitative, and a sheet-like configuration, for example, may be possible.

Configuration Example of Printing System

Figure 4:
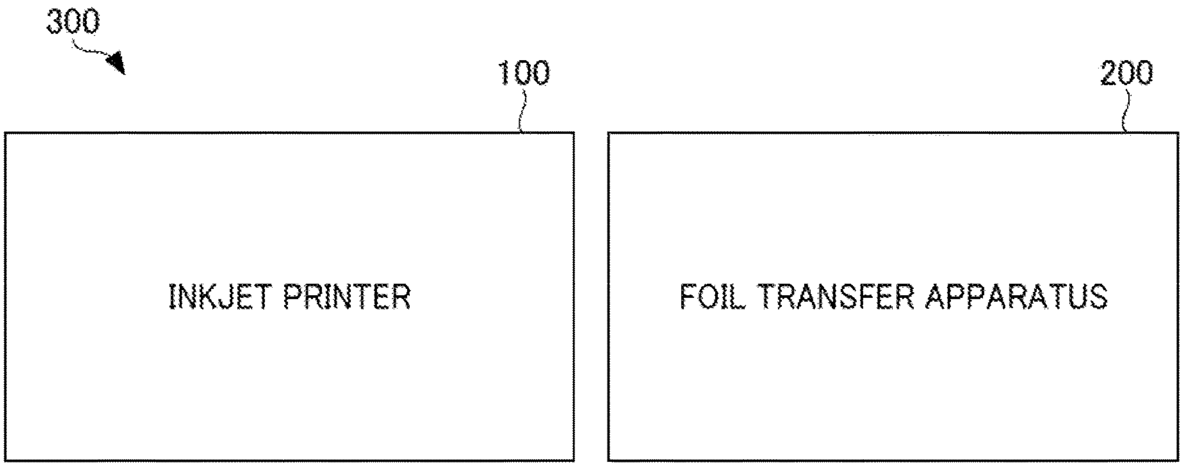
FIG. 4 is a block diagram illustrating a general configuration of a printing system according to an embodiment.

FIG. 4 is a block diagram illustrating a general configuration of a printing system 300 according to the present embodiment. The printing system 300 includes an inkjet printer 100 and a foil transfer apparatus 200.

The inkjet printer 100 forms the image layer 11 and the adhesive layer 12 on the base 10 on the basis of image data. The inkjet printer 100 discharges ultraviolet curable coloring ink to print any image on the base 10 to thus form the image layer 11 on the base 10. Furthermore, the inkjet printer 100 discharges ultraviolet curable clear ink or primer ink to print any image on the base 10 to thus form the adhesive layer 12 on the base 10.

The foil transfer apparatus 200 transfers the foil 13 onto the adhesive layer 12.

The coloring ink corresponds to ink for the image layer. The clear ink or the primer ink corresponds to ink for the adhesive layer.

In the present embodiment, the inkjet printer 100 discharges ultraviolet curable clear ink to form the adhesive layer 12.

In the present embodiment, the printing system 300 discharges both the ink for forming the image layer 11 and the ink for forming the adhesive layer 12, but the configuration is not limitative. The printing system 300 may include two or more inkjet printers, such as an inkjet printer that discharges ink for forming the image layer 11 and an inkjet printer that discharges ink for forming the adhesive layer 12. Furthermore, the ink for forming the adhesive layer 12 may not be ultraviolet curable liquid.

Configuration Example of Inkjet Printer

Figure 5:
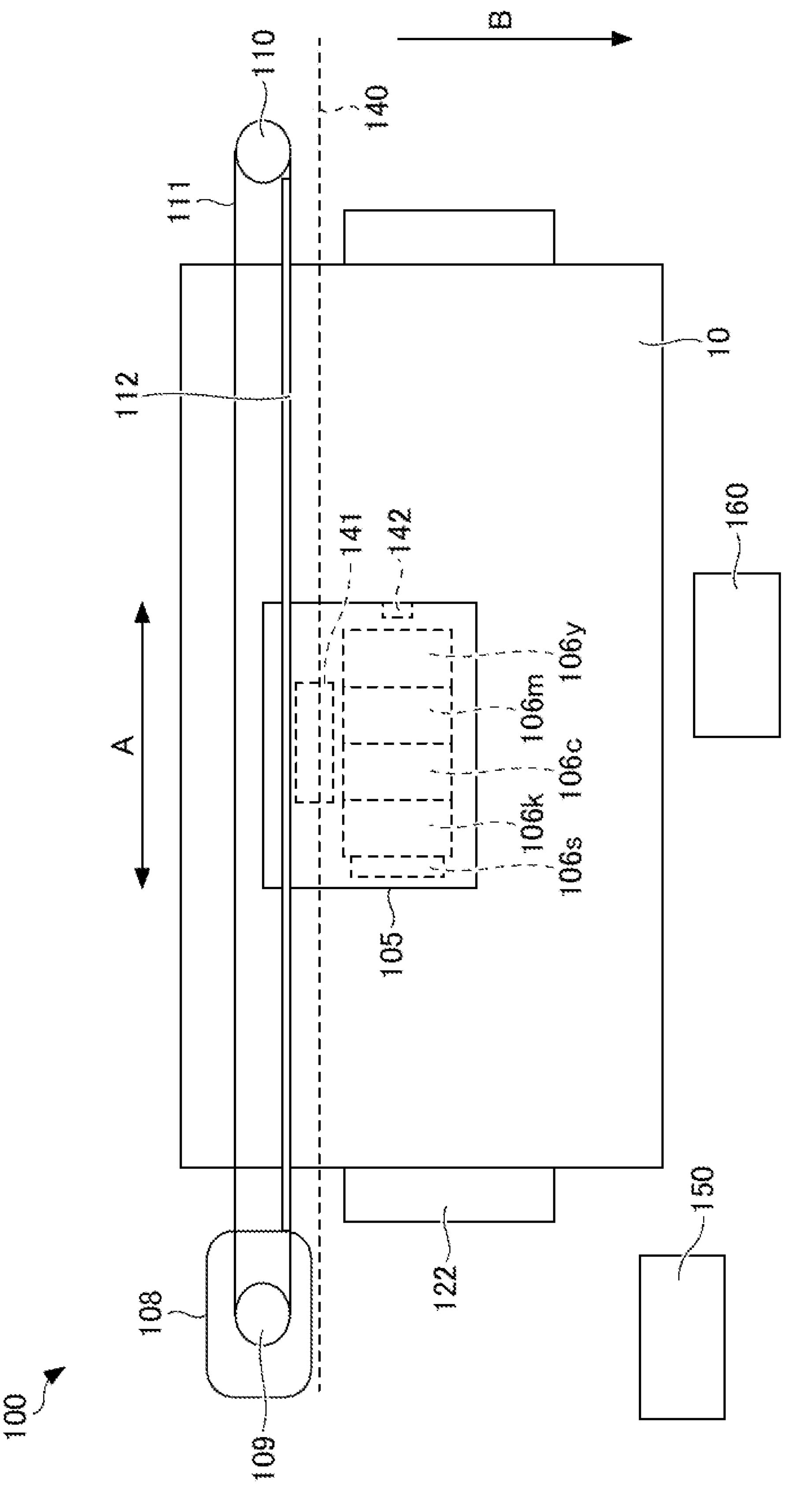
FIG. 5 is a diagram illustrating a configuration of an inkjet printer according to an embodiment.

FIG. 5 is a diagram illustrating an example of a configuration of the inkjet printer 100, in which the inkjet printer 100 is viewed in a direction opposite to the direction in which the inkjet printer 100 discharges ink.

As illustrated in FIG. 5, the inkjet printer 100 includes a carriage 105, heads 106, a platen 122, an encoder sensor 141, and an ultraviolet (UV) emission light source 142. The inkjet printer 100 also includes a main-scanning motor 108, a gear 109, a pressing roller 110, a timing belt 111, a guide rod 112, an encoder sheet 140 (linear scale), a controller 150, and an operation unit 160. The inkjet printer 100 forms the image layer 11 and the adhesive layer 12 on the base 10 conveyed along a sub-scanning direction B by a registration roller or the like.

The carriage 105 includes heads 106*y* that discharge a yellow (Y) coloring ink, heads 106*m* that discharge a magenta (M) coloring ink, heads 106*c* that discharge a cyan (C) coloring ink, and heads 106*k* that discharge a black (K) coloring ink. The carriage 105 also includes heads 106*s* that discharge a clear ink for forming the adhesive layer 12. The heads 106*y*, 106*m*, 106*c*, 106*k*, and 106*s* are arranged along a main-scanning direction A. The heads 106*y*, 106*m*, 106*c*, 106*k*, and 106*s* have the same configuration except that the inks to be discharged are different, and thus are collectively referred to as the heads 106 unless particularly distinguished.

Each of the heads 106*y*, the heads 106*m*, the heads 106*c*, and the heads 106*k* is an example of a first head that discharges an ink for the image layer. The heads 106*s* are an example of a second head that discharges inks for the adhesive layer.

The inkjet printer 100 transmits the driving force of the main-scanning motor 108 to the carriage 105 through the gear 109, the pressing roller 110, and the timing belt 111 to reciprocate the carriage 105 in the main-scanning direction A along the guide rod 112. In the inkjet printer 100, the encoder sensor 141 provided in the carriage 105 reads the encoder sheet 140 provided along the moving direction of the carriage to detect the position of the moved carriage 105.

In the inkjet printer 100, the movement of the carriage 105 in the main-scanning direction A and the conveyance of the base 10 in the sub-scanning direction B are alternately performed to form the image layer 11 and the adhesive layer 12 on the base 10.

The UV emission light source 142 irradiates the adhesive layer 12 on the base 10 with ultraviolet light. The UV emission light source 142 emits ultraviolet light to cure the inks discharged from the heads 106. In the present embodiment, the UV emission light source 142 can irradiate, in addition to the adhesive layer 12, the image layer 11 on the base 10 with ultraviolet light to cure the coloring inks constituting the image layer 11.

The controller 150 can control the discharge of the ink by each of the plurality of heads 106, the emission of ultraviolet light by the UV emission light source 142, the movement of the carriage 105, the conveyance of the base 10 by the registration roller, and the like. The controller 150 also acquires image data via a network or the like connected to the inkjet printer 100. In the present embodiment, in particular, the controller 150 is an example of a control unit or circuitry that controls the heads 106*s* so that in a case where the width of an image area included in the adhesive layer 12 is less than a predetermined threshold, the image area is formed with a second ink, and in a case where the width of the image area is not less than the predetermined threshold, the image area is formed with a first ink.

The operation unit 160 is used, for example, by a user of the printing system 300 to give a printing instruction to the inkjet printer 100, and by a user to specify whether the glossy impression of the foil 13 to be formed on the printed matter 1 is matte or glossy. The operation unit 160 includes a touch panel or the like that receives touch operation.

Configuration Example of Foil Transfer Apparatus

Figure 6:
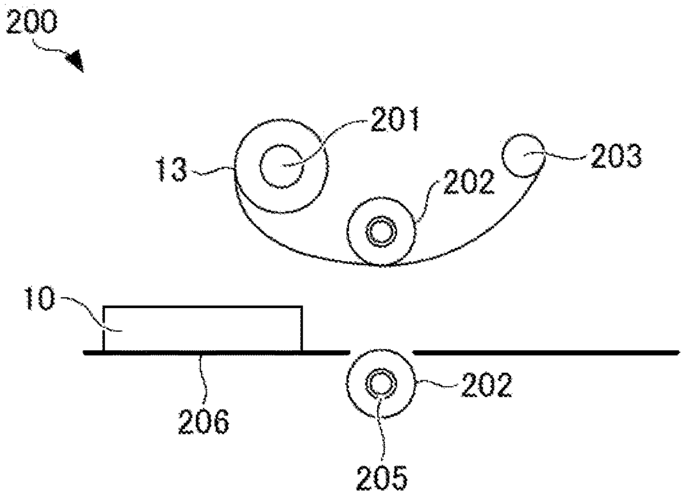
FIG. 6 is a diagram illustrating a configuration of a foil transfer apparatus according to an embodiment.

FIG. 6 is a diagram illustrating an example of a configuration of the foil transfer apparatus 200. The foil transfer apparatus 200 includes a sheet feeding unit 201, a pair of transfer rollers 202, a winding unit 203, a transfer roller 204, a heater 205, and a placement table 206.

In the foil transfer apparatus 200, the sheet feeding unit 201, the pair of transfer rollers 202, and the winding unit 203 are each rotated by a driving force of a motor or the like to convey the base 10, as a transfer target body, on the placement table 206, while the foil 13 is transferred to the base 10.

The sheet feeding unit 201 is a supply mechanism that rotates a roller while winding, around the roller, the base film 131 holding the foil 13, to supply the base film 131 toward the base 10.

The pair of transfer rollers 202 includes two transfer rollers for transferring the foil 13 to the base 10. One of the two transfer rollers included by the pair of transfer rollers 202 contains the heater 205. The transfer rollers include an elastic material, such as rubber or sponge, at least on the surfaces. The pair of transfer rollers 202 holds the base 10 and the base film 131 between the two transfer rollers to apply a pressure to the base 10 and the base film 131, to thus transfer the foil 13 held by the base film 131 to the base 10.

The winding unit 203 is a winding mechanism that winds the base film 131 after the transfer of the foil 13 to the base 10.

Configuration Example of Carriage

Figure 7:
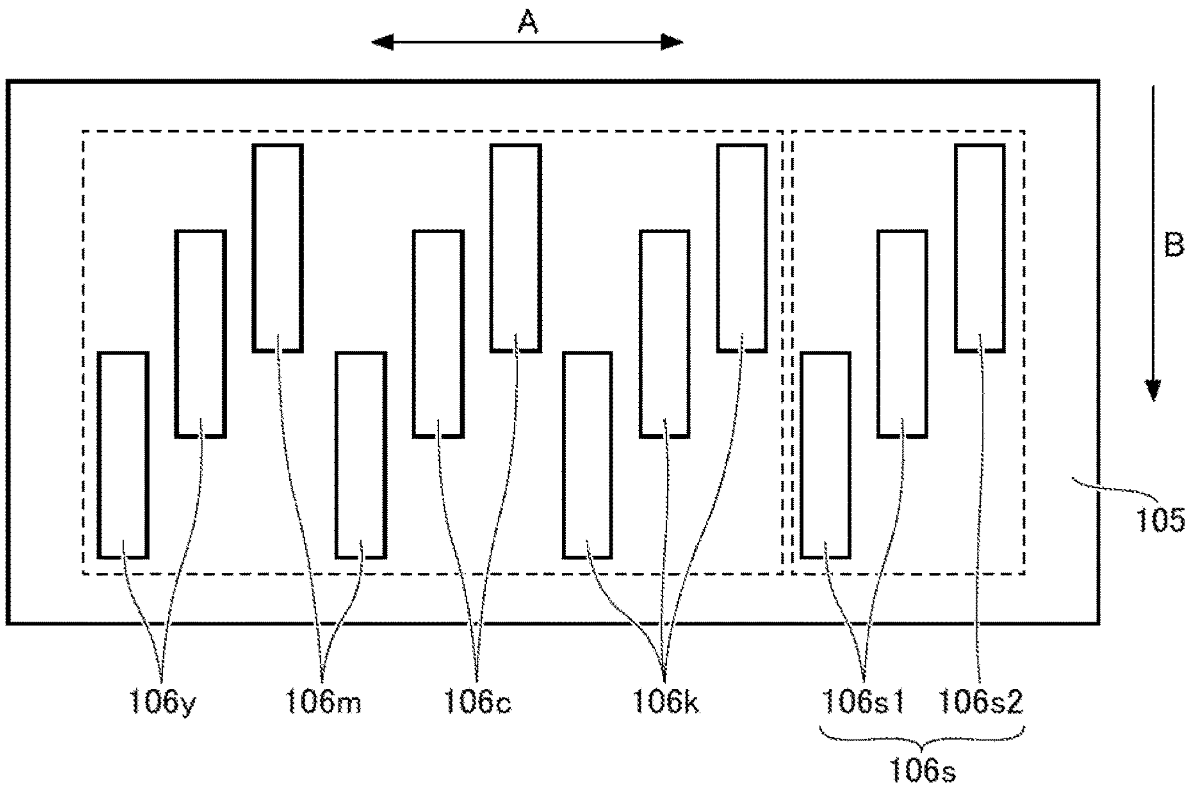
FIG. 7 is a diagram illustrating a configuration of a carriage according to an embodiment.

FIG. 7 is a diagram illustrating an example of a configuration of the carriage 105 of the inkjet printer 100, in which the carriage 105 is viewed from the side of a direction in which the inkjet printer 100 discharges the inks.

As illustrated in FIG. 7, the carriage 105 includes the two heads 106*y*, the two heads 106*m*, the two heads 106*c*, the three heads 106*k*, two heads 106*s*1, and one head 106*s*2. The heads 106*s* include the two heads 106*s*1 and the one head 106*s*2.

The two heads 106*y* are staggered along the sub-scanning direction B. Similarly, the two heads 106*m*, the two heads 106*c*, the three heads 106*k*, and the two heads 106*s*1 are each staggered along the sub-scanning direction B.

The coloring inks discharged from the heads 106*y*, 106*m*, 106*c*, and 106*k* are one type of inks having the same composition although the colors are different. That is, the yellow (Y) coloring ink used in the inkjet printer 100 is only one type of ink having predetermined wet spreadability. The same applies to the magenta (M) coloring ink, the cyan (C) coloring ink, and the black (K) coloring ink.

The two heads 106*s*1 each correspond to a third head that discharges a first ink. The one head 106*s*2 corresponds to a fourth head that discharges a second ink. The first ink discharged by each of the two heads 106*s*1 and the second ink discharged by the head 106*s*2 have different compositions, and are different types of inks. The second ink discharged by the head 106*s*2 has lower wet spreadability than the wet spreadability of the first ink discharged by each of the two heads 106*s*1.

Functional Configuration Example of Controller

Figure 8:
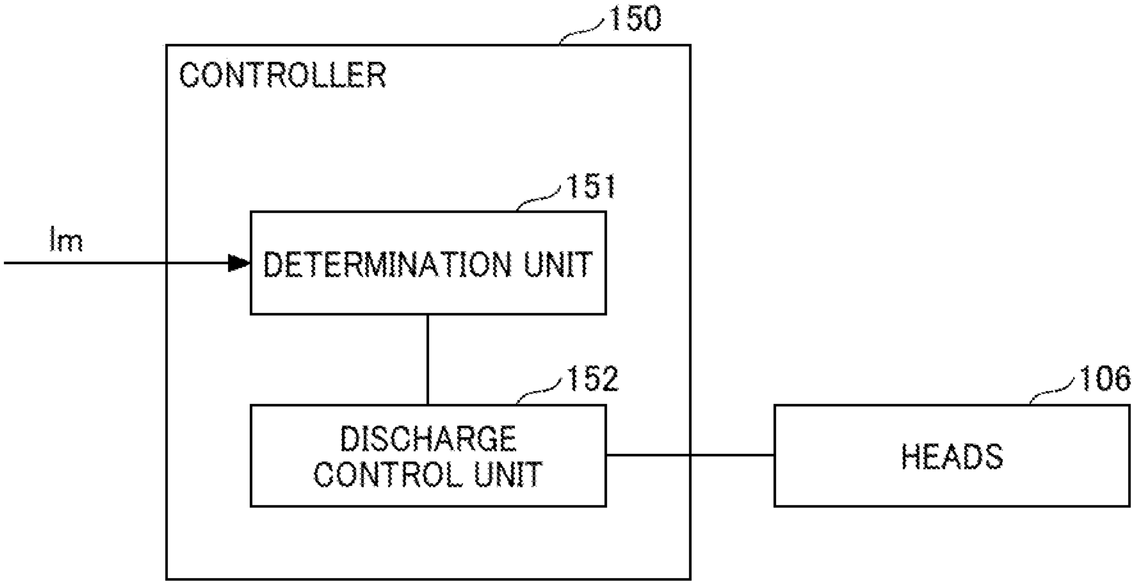
FIG. 8 is a block diagram illustrating a functional configuration of a controller according to an embodiment.

FIG. 8 is a block diagram illustrating an example of a functional configuration of the controller 150 of the inkjet printer 100. The controller 150 controls the operation of the entire inkjet printer 100. In the present embodiment, the controller 150 particularly includes a determination unit 151 and a discharge control unit 152.

Each function of the determination unit 151 and the discharge control unit 152 can be implemented with an electric circuit, or part or all of these functions can be implemented with software (a central processing unit (CPU)). Alternatively, these functions of the controller 150 may be implemented with a plurality of circuits or a plurality of pieces of software. In addition to the functions of the determination unit 151 and the discharge control unit 152, the controller 150 may include functions, such as a function of controlling both a mechanism for moving the carriage 105 in the main-scanning direction A and a mechanism for moving the base 10 in the sub-scanning direction B.

The determination unit 151 determines whether or not the width of an image area included in the adhesive layer 12 is less than a predetermined threshold. For example, image data Im as a source of an image to be formed on the base 10 is input into the determination unit 151 from an external apparatus, such as a client personal computer (PC), and the determination unit 151 performs the above determination on the image data Im.

The image area is a partial image (part of the image) included in the adhesive layer 12, and includes a partial image, such as a thin-line portion including thin lines or a solid portion including a painted-out solid area. In the thin-line portion, the width of the image area corresponds to the gap between the thin lines included in the thin-line portion. In the solid portion, the width of the image area corresponds to the width of the solid portion.

For example, in a case where the gap between thin lines included in a thin-line portion is narrow, and is narrower than the width determined with the threshold, the determination unit 151 determines that the width of the image area is less than the threshold. For example, in a case where the gap between thin lines included in a thin-line portion is wider than the threshold, or in a case where the width of a solid portion is wider than the threshold, the determination unit 151 determines that the width of the image area is not less than the threshold.

In a case where the determination unit 151 determines that the width of the image area is less than the threshold, the discharge control unit 152 makes the head **106*s*2 discharge the second ink to form the image area with the second ink. In a case where the determination unit 151 determines that the width of the image area is not less than the threshold, the discharge control unit 152 makes the heads 106*s*1 discharge the first ink to form the image area with the first ink. The discharge control unit 152 can also make the heads 106*y*, 106*m*, 106*c*, and 106*k* discharge the inks for the image layer to form the image layer 11**.

For example, in a case where the gap between thin lines included in a thin-line portion is narrow, the formation of the thin-line portion with an ink having large wet spreadability causes the ink to wetly spread, and the thin lines combine. As a result, in a case where the foil 13 is transferred to the adhesive layer 12 in the thin-line portion, the transfer unevenness of the foil 13 may occur, for example, the image in the thin-line portion cannot be visually recognized as the thin-line portion. In a case where the width of an image area, such as a thin-line portion, included in the adhesive layer 12 is less than the threshold, the controller 150 forms the image area with the second ink having wet spreadability smaller than the wet spreadability of the first ink to suppress the wet spreading of the ink and stably form a foil transfer image in a thin-line portion and the like.

Operation Example of Inkjet Printer

Figure 9:
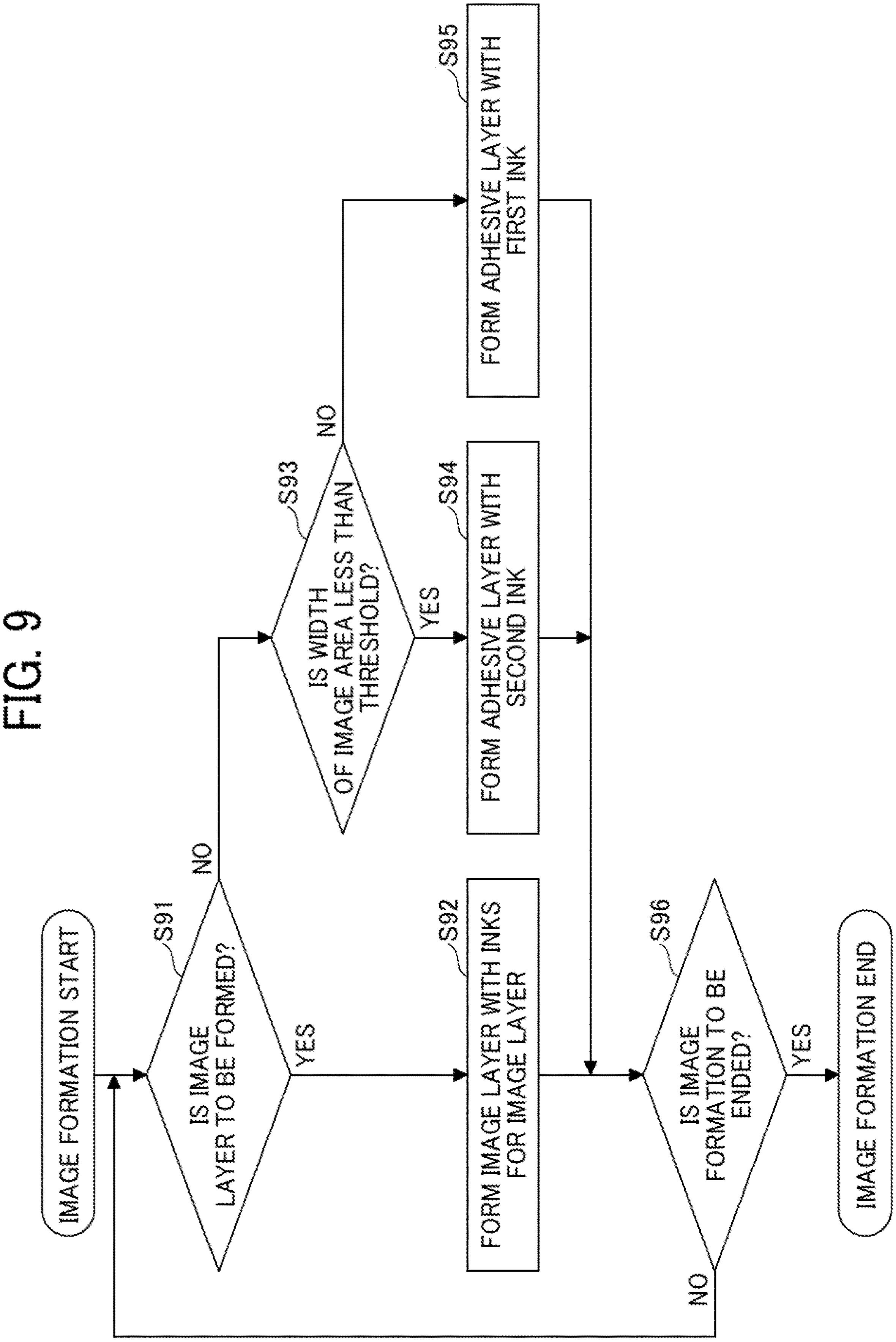
FIG. 9 is a flowchart of an example of operation of the inkjet printer, according to an embodiment.

FIG. 9 is a flowchart illustrating an example of operation of the inkjet printer 100. The inkjet printer 100 starts the operation in FIG. 9, for example, in a case where receiving an image formation start instruction due to the receipt of image data Im from a client PC, or in a case where receiving an image formation start instruction via the operation unit 160.

First, in step S91, in the inkjet printer 100, on the basis of the image data Im, the controller 150 determines whether or not an image layer 11 is to be formed.

In a case where in step S91, it is determined that an image layer 11 is to be formed (Yes in step S91), in step S92, in the inkjet printer 100, the discharge control unit 152 makes the heads **106*y*, 106*m*, 106*c*, and 106*k* discharge the inks for the image layer to form the image layer 11 on a base 10**.

On the other hand, in a case where in step S91, it is determined that an image layer 11 is not to be formed (No in step S91), in step S93, on the basis of the image data Im, the inkjet printer 100 determines whether or not the width of an image area included in an adhesive layer 12 is less than the threshold.

In a case where in step S93, it is determined that the width of an image area is less than the threshold (Yes in step S93), in step S94, in the inkjet printer 100, the controller 150 makes the head **106*s*2 discharge the second ink to form the adhesive layer 12 on the base 10** with the second ink.

On the other hand, in a case where in step S93, it is determined that the width of an image area is not less than the threshold (No in step S93), in step S95, in the inkjet printer 100, the controller 150 makes the heads **106*s*1 discharge the first ink to form the adhesive layer 12 on the base 10** with the first ink.

Next, in step S96, in the inkjet printer 100, the controller 150 determines whether or not to end the image formation. For example, on the basis of the image data Im or according to an image formation end instruction via the operation unit 160, the controller 150 determines whether or not to end the image formation.

In a case where in step S96, it is determined to end the image formation (Yes in step S96), the inkjet printer 100 ends the operation. In a case where in step S96, it is determined not to end the image formation (No in step S96), the inkjet printer 100 performs the operation after step S91 again.

In this way, the inkjet printer 100 can form the image layer 11 and the adhesive layer 12 on the base 10.

Action of Inkjet Printer

Figure 10:
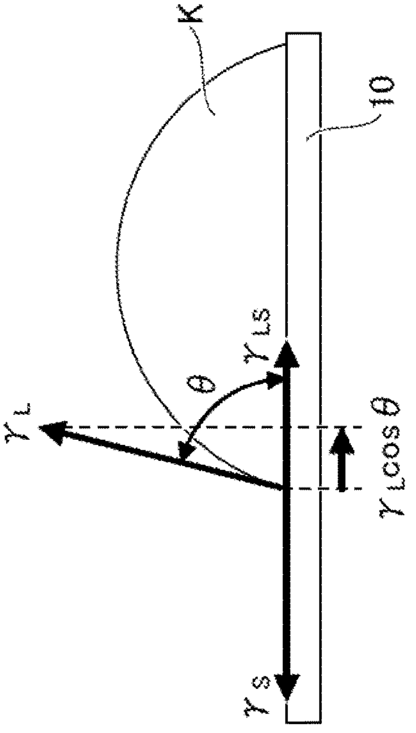
FIG. 10 is a diagram illustrating a contact angle between a base and ink.
Figure 11:
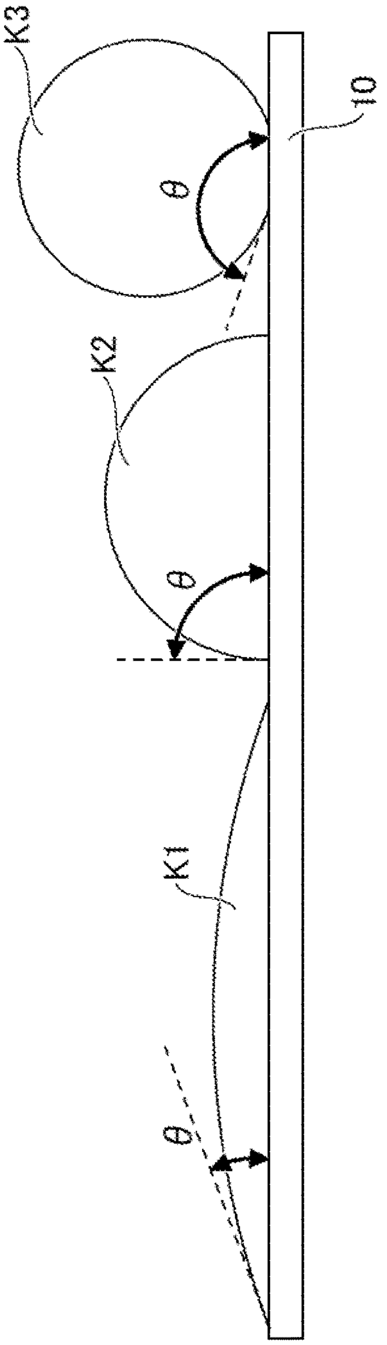
FIG. 11 is a diagram illustrating wet spreadability of inks.
Figure 12:
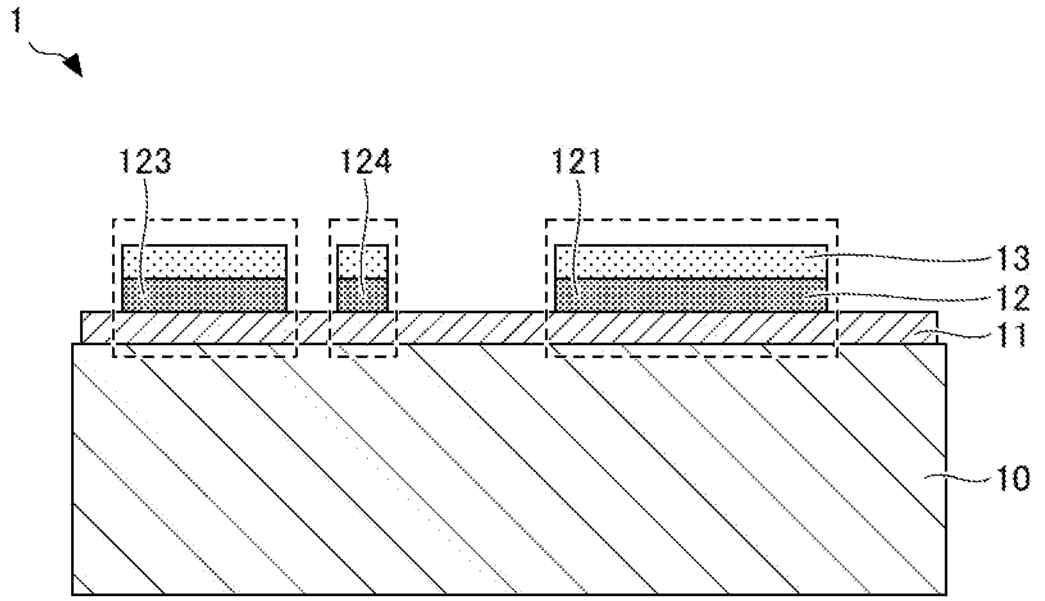
FIG. 12 is a cross-sectional view of a printed matter according to an embodiment.
Figure 13:
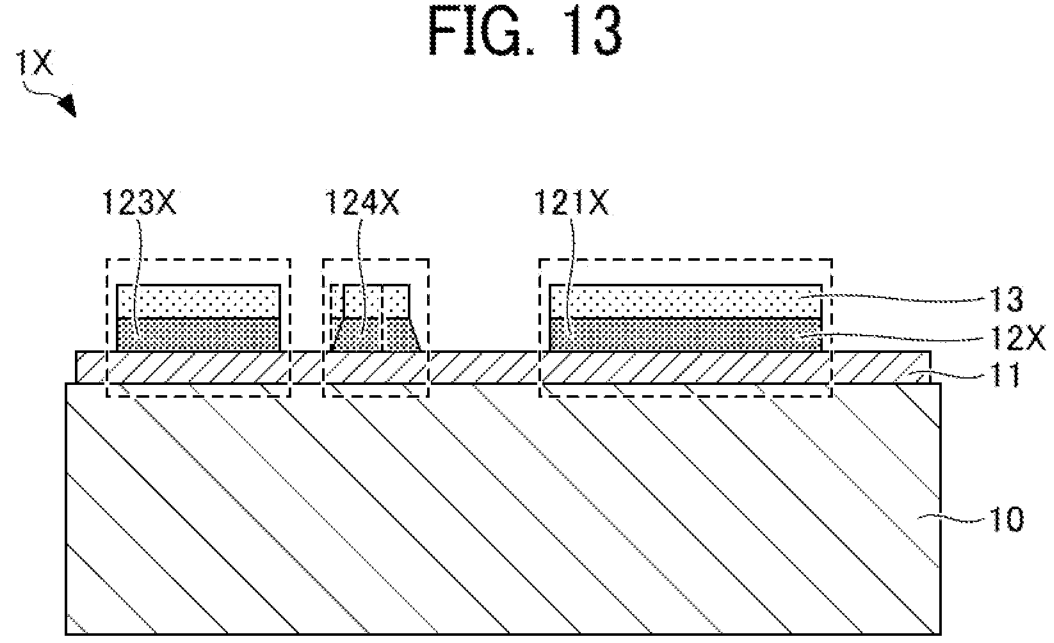
FIG. 13 is a cross-sectional view of a printed matter according to a comparative example.

The action of the inkjet printer 100 will be described with reference to FIGS. 10 to 13. FIG. 10 is a diagram for explaining a contact angle between a base 10 and ink. FIG. 11 is a diagram for explaining wet spreadability of inks. FIG. 12 is a cross-sectional view illustrating an example of a printed matter 1 according to an embodiment. FIG. 13 is a cross-sectional view illustrating a printed matter 1X according to a comparative example. In FIGS. 12 and 13, components having the same functions are denoted by the same reference numerals to simplify the description.

The wet spreadability of an ink can be generally expressed by a surface tension, and the following expression is established on the basis of Young's equation.

[Expression 1]

$$\gamma_S=\gamma_L\times\cos\theta+\gamma_{LS} \tag{1}$$

where $\gamma_S$ represents the surface tension of the foundation of the adhesive layer 12, $\gamma_L$ represents the surface tension of an ink, $\gamma_{LS}$ represents the interfacial tension between the foundation of the adhesive layer 12 and the ink, and θ represents the contact angle. The surface tensions $\gamma_S$ and $\gamma_L$, the interfacial tension $\gamma_{LS}$, and the contact angle θ have the relationship illustrated in FIG. 10.

The wet spreadability of the ink is determined by the degree of the contact angle θ between the ink and the foundation of the adhesive layer 12. Above Expression 1 can be transformed into following Expression 2.

[Expression 2]

$$\cos\theta=\frac{\gamma_{LS}-\gamma_S}{\gamma_L} \tag{2}$$

As can be seen from above Expression 2, when cos θ increases and approaches one, the contact angle approaches zero degrees, and as a result, the wet spreadability increases, and the adhesive layer 12 is formed widely. Conversely, when cos θ decreases and approaches zero, the contact angle increases and approaches 90 degrees and the wet spreadability decreases. When the wet spreadability decreases, the width of the ink having landed on the foundation of the adhesive layer 12 becomes substantially equal to the width of an ink droplet formed by a discharged ink. In FIG. 11, the inks K1, K2, and K3 have higher wet spreadability in this order.

When the surface tension $\gamma_L$ of the ink forming the adhesive layer 12 is increased, cos θ approaches zero, the contact angle θ increases, and wet spreading of the ink on the foundation (the base 10 in FIG. 11) is suppressed. Therefore, when the width of an image area included in the adhesive layer 12 is small, an ink whose cos θ is close to zero may be used.

In the present embodiment, the inkjet printer 100 determines in advance the relationship between the threshold of the width of an image area included in the adhesive layer 12 and cos θ in the ink. In a case where the width of an image area is less than the threshold, the inkjet printer 100 forms the image area using the second ink whose cos θ is closer to zero than the first ink. Thus, the inkjet printer 100 forms a visually recognizable image area having a narrow width, and suppresses transfer unevenness of the foil 13.

In the printed matter 1X according to a comparative example illustrated in FIG. 13, an adhesive layer 12X includes solid portions 121X and 123X and a thin-line portion 124X. The adhesive layer 12X is formed on an image layer 11 on a base 10. Foil 13 is formed on the adhesive layer 12X. In this case, the foundation of the adhesive layer 12X corresponds to the image layer 11.

For example, when one type of ink is used as an ink for the adhesive layer, the ink forming the thin-line portion 124X in the adhesive layer 12X wetly spreads on the image layer 11, as illustrated in FIG. 13, and thus adjacent thin-line portions 124X combine, and transfer unevenness of the foil 13 occurs in a foil transfer image on the thin-line portions 124X.

On the other hand, in FIG. 12, an adhesive layer 12 includes solid portions 121 and 123 and a thin-line portion 124. The adhesive layer 12 is formed on an image layer 11 on a base 10. Foil 13 is formed on the adhesive layer 12. In this case, the foundation of the adhesive layer 12 corresponds to the image layer 11.

In the present embodiment, two types of inks are used as inks for the adhesive layer, the solid portions 121 and 123 are formed with the first ink, and the thin-line portion 124 is formed with the second ink having lower wet spreadability than the wet spreadability of the first ink. As a result, as illustrated in FIG. 12, wet spreading, on the image layer 11, of the second ink forming the thin-line portion 124 in the adhesive layer 12 can be suppressed, and transfer unevenness of the foil 13 in a foil transfer image on the thin-line portion 124 can be suppressed.

Effects of Inkjet Printer

As described above, the inkjet printer 100 forms, on the base 10, the image layer 11, and the adhesive layer 12 on which the foil 13 can be formed. The inkjet printer 100 includes the heads 106*y*, 106*m*, 106*c*, and 106*k* (first head) that discharge the inks for the image layer. As a second head, the inkjet printer 100 also includes the heads 106*s*1 (third head) that discharge the first ink as an ink for the adhesive layer, and the head 106*s*2 (fourth head) that discharges the second ink, as an ink for the adhesive layer, having lower wet spreadability than the wet spreadability of the first ink. The inkjet printer 100 also includes the controller 150 (control unit) that controls the heads 106*s* so that in a case where the width of an image area included in an adhesive layer 12 is less than the predetermined threshold, the image area is formed with the second ink, and in a case where the width of the image area is not less than the predetermined threshold, the image area is formed with the first ink.

In a case where the width of an image area, such as a thin-line portion 124, in the adhesive layer 12 is less than the threshold, in the inkjet printer 100, the controller 150 makes the second ink having lower wet spreadability than the wet spreadability of the first ink be discharged to form the image area. Thus, the inkjet printer 100 can suppress, for example, the combination of adjacent thin-line portions 124. As described above, according to the present embodiment, it is possible to provide the inkjet printer 100 capable of suppressing the transfer unevenness of the foil 13.

In the present embodiment, the configuration in which the inkjet printer 100 includes, as a second head, the three heads of the heads 106*s*1 and the head 106*s*2 has been exemplified, but the configuration is not limitative. In the inkjet printer 100, one head may constitute the second head, and the first ink and the second ink may be discharged from the one head. In the inkjet printer 100, three or more heads may constitute the second head, and the first ink and the second ink may be discharged from the three or more heads.

In the present embodiment, the inks for the adhesive layer are discharged onto the image layer 11 on the base 10, and the type of the inks for the image layer is one type. Thus, the foil 13 transferred onto the adhesive layer 12 can be made conspicuous as compared with a case where the inks for the adhesive layer are discharged onto an image layer 11 formed with a plurality of types of inks for the image layer.

In the present embodiment, the first ink is an ink whose contact angle between the first ink and the image layer 11 (foundation of the adhesive layer) is less than 90 degrees, and the second ink is an ink whose contact angle between the second ink and the image layer 11 is 90 degrees or more. Thus, according to the present embodiment, it is possible to provide the inkjet printer 100 capable of suppressing, for example, the combination of adjacent thin-line portions 124, and suppressing the transfer unevenness of the foil 13.

In the present embodiment, the image layer 11 is exemplified as the foundation of the adhesive layer, but the foundation of the adhesive layer may be the base 10. For example, in a case where the adhesive layer 12 and the image layer 11 are formed on the opposite sides, respectively, of the base 10, the adhesive layer 12 is formed on a surface of the base 10 on the side opposite to the surface on which the image layer 11 is formed. In this case, the contact angle θ corresponds to the contact angle between the second ink and the base 10.

Other Embodiments

Although several embodiments of the present disclosure have been described in detail above, the present disclosure is not limited to the specific embodiments, and various modifications and changes can be made within the scope of the gist of embodiments of the present disclosure described in the claims.

For example, a plurality of inkjet printers may be used, and the inkjet printer that forms the image layer 11 and the inkjet printer that forms the adhesive layer 12 may be different from each other. According to this configuration, in a case where the image layer 11 and the adhesive layer 12 are formed on mutually opposite surfaces of the base 10, the step of reversing the base 10 can be omitted, and the printing time can be shortened.

The inkjet printer 100 and the foil transfer apparatus 200 can be configured as an integrated apparatus instead of a separate apparatus.

Embodiments also include a method for producing a printed matter. For example, the method for producing a printed matter is a method for producing a printed matter with an inkjet printer that forms, on a base, an image layer and an adhesive layer on which foil can be formed, in which in the inkjet printer, a first head discharges an ink for the image layer, a second head discharges inks for the adhesive layer including a first ink and a second ink having wet spreadability lower than wet spreadability of the first ink, and a control unit controls the second head so that in a case where a width of an image area included in the adhesive layer is less than a predetermined threshold, the image area is formed with the second ink, and in a case where the width of the image area is not less than the predetermined threshold, the image area is formed with the first ink. Such a method for producing a printed matter provides similar effects as the effects of the inkjet printer 100 described above. The method for producing a printed matter may be implemented with a circuit, such as a CPU or large-scale integration (LSI), an integrated circuit (IC) card, a single module, or the like.

All numbers, such as ordinal numbers and quantities, used in the description of the embodiments are exemplified to specifically describe the technology of the present disclosure, and the present disclosure is not limited to the exemplified numbers. In addition, the above-described connections among the components are examples for specifically describing the technology of the present disclosure, and connections for implementing functions of the present disclosure are not limited to the above-described examples.

Furthermore, the division into the blocks in the functional block diagrams is an example, and a plurality of blocks may be implemented as one block, one block may be divided into a plurality of blocks, or part of the function may be transferred to another block. In addition, functions of a plurality of blocks having similar functions may be processed in parallel or in a time division manner by single hardware or software.

In addition, each function of the above-described embodiments can be implemented by one or a plurality of processing circuits. Here, the "processing circuit" in the present specification includes a processor programmed to execute each function with software like a processor implemented by an electronic circuit, and a device, such as an application-specific integrated circuit (ASIC), a digital signal processor (DSP), a field-programmable gate array (FPGA), or a conventional circuit module, designed to execute each function described above.

The invention claimed is:

1. An inkjet printer for forming, on a base, an image layer and an adhesive layer on which foil is to be formed, the inkjet printer comprising:

a first head configured to discharge an ink for the image layer;

a second head configured to discharge inks for the adhesive layer including a first ink and a second ink having a lower wet spreadability than a wet spreadability of the first ink; and processing circuitry configured to control the second head to:

form an image area included in the adhesive layer with the second ink in a case where a width of the image area is less than a threshold; and form the image area with the first ink in a case where the width of the image area is not less than the threshold.

2. The inkjet printer according to claim 1, wherein the second head includes a third head configured to discharge the first ink and a fourth head configured to discharge the second ink.

3. The inkjet printer according to claim 1, wherein the inks for the adhesive layer are discharged onto the image layer on the base, and the ink for the image layer is of one type.

4. The inkjet printer according to claim 1, wherein the first ink is an ink whose contact angle between the first ink and a foundation of the adhesive layer is less than 90 degrees.

5. The inkjet printer according to claim 1, wherein the second ink is an ink whose contact angle between the second ink and a foundation of the adhesive layer is 90 degrees or more.

6. A printing system comprising:

the inkjet printer according to claim 1; and a foil transfer apparatus configured to transfer the foil onto the adhesive layer.

7. A method for producing a printed matter with an inkjet printer to form, on a base, an image layer and an adhesive layer on which foil is to be formed, the method comprising:

discharging an ink for the image layer from a first head of the inkjet printer;

discharging, from a second head, inks for the adhesive layer including a first ink and a second ink having a wet spreadability lower than a wet spreadability of the first ink; and controlling the second head to form an image area included in the adhesive layer with the second ink in a case where a width of the image area is less than a threshold, and form the image area with the first ink in a case where the width of the image area is not less than the threshold.

* * * * *